May 1, 1934.  G. J. SMITH  1,956,701
AGITATING DEVICE FOR AUTOMATIC REFRIGERATORS
Filed Sept. 25, 1930  3 Sheets-Sheet 1
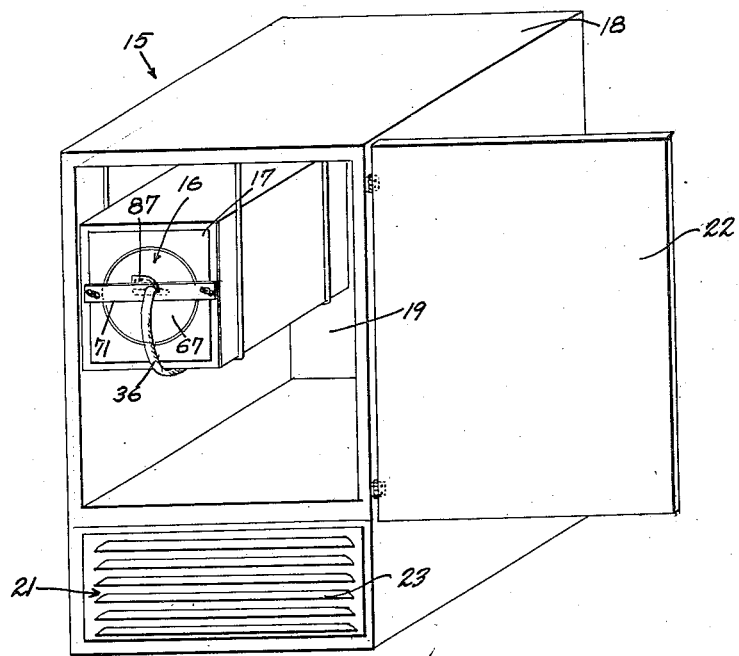
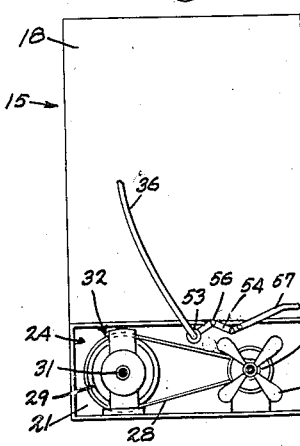
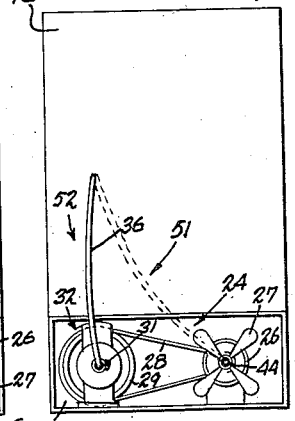
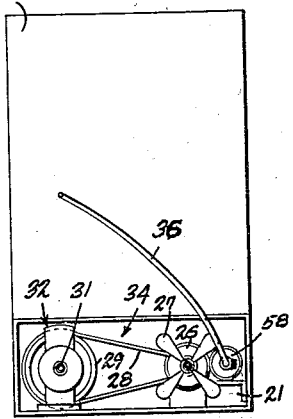
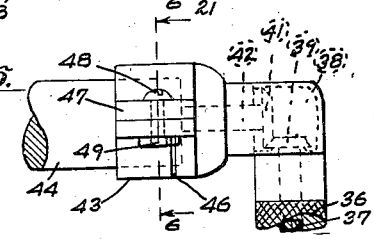
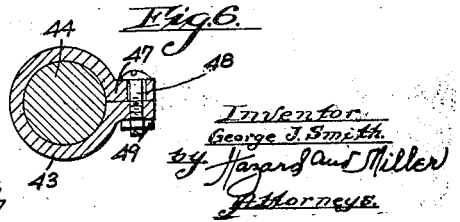

May 1, 1934.  G. J. SMITH  1,956,701
AGITATING DEVICE FOR AUTOMATIC REFRIGERATORS
Filed Sept. 25, 1930   3 Sheets-Sheet 2
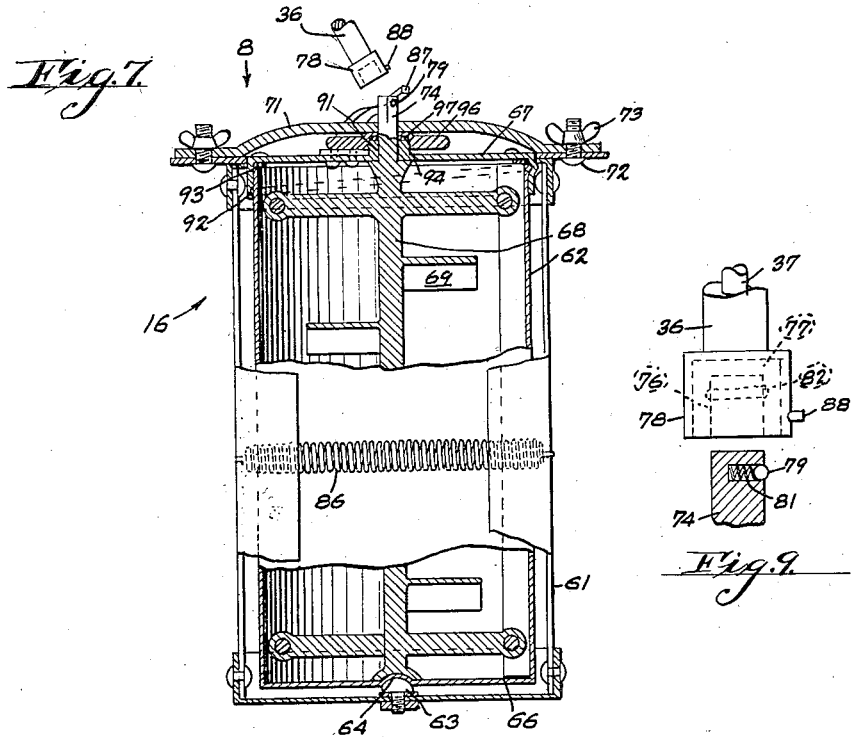
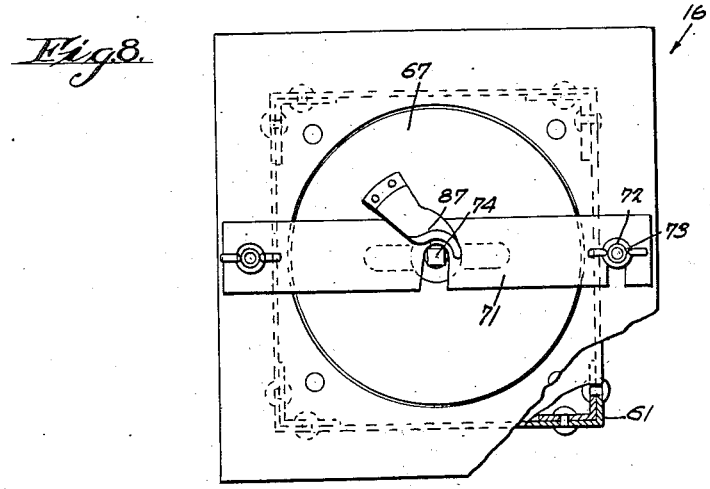
Inventor
George J. Smith
by Hazard and Miller
Attorneys.

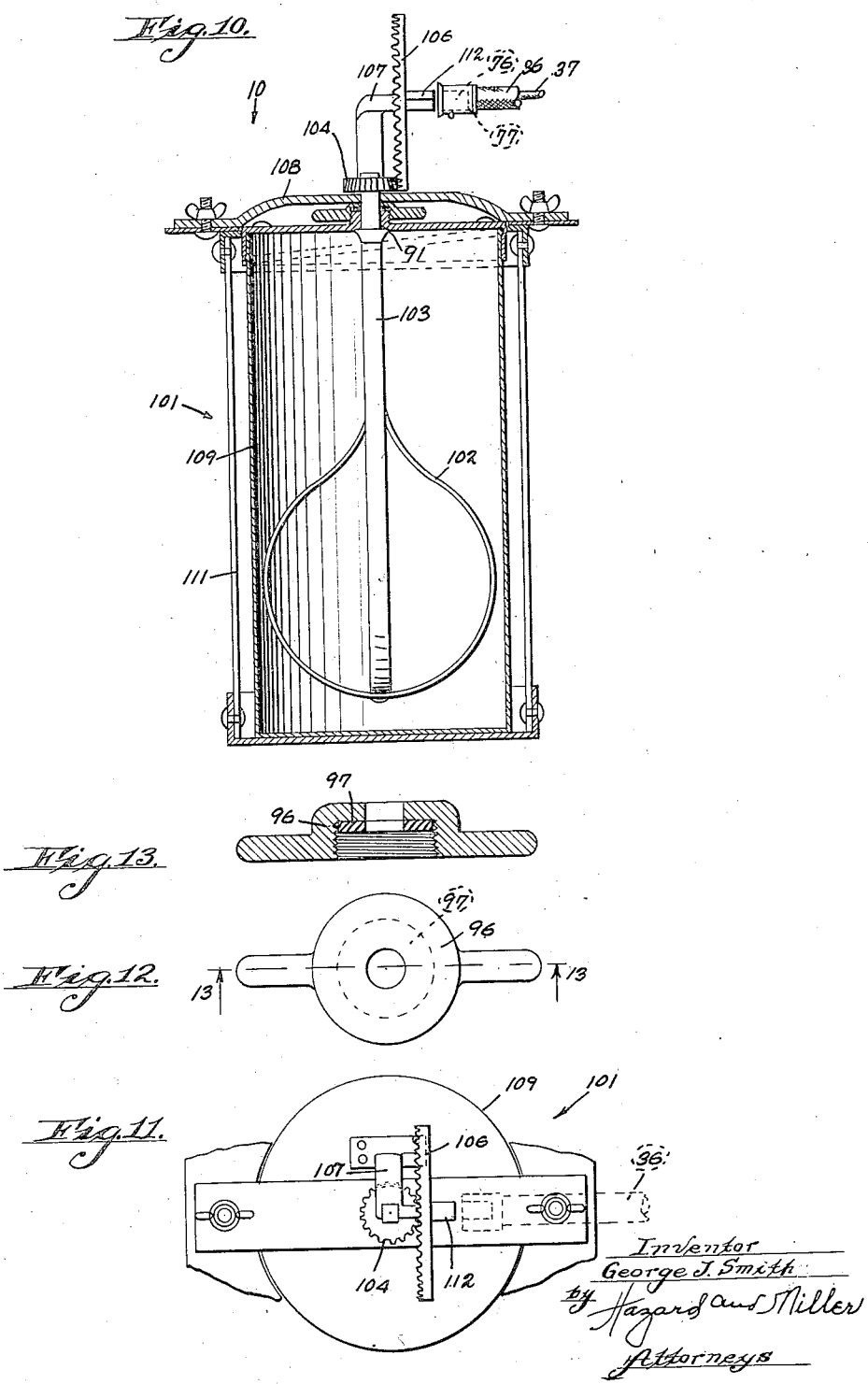

Patented May 1, 1934

1,956,701

UNITED STATES PATENT OFFICE 1,956,701

AGITATING DEVICE FOR AUTOMATIC REFRIGERATORS

George J. Smith, Los Angeles, Calif.

Application September 25, 1930, Serial No. 484,376

5 Claims. (Cl. 62—114)

This invention relates to automatic refrigerators and more especially to the small domestic or household refrigerator now commonly employed.

An object of the invention is to provide a power take-off for refrigerators of the general class described whereby a part of the power from the motor which is operatively coupled to the compressor of the refrigerator may be made available for such work as beating eggs, mixing batters and beverages, and performing similar operations for the purpose of facilitating kitchen work.

Another object is to provide a specialized form of agitator which may be employed advantageously in connection with the power take-off to be operated thereby.

Another object is to provide an agitator adapted to be operated by means of the power take-off hereinabove mentioned and which is adapted to be received within the cooling unit of the automatic refrigerator, with the result that by its use frozen and beaten foods, such as ice cream, sherbets, and the like, may be made easily and expeditiously in the domestic refrigerator without the necessity of employing gelatin or its equivalent to prevent crystallization of the ultimate product.

Another object is to provide means for automatically disengaging the power take-off from the agitating device when the contents of the agitator receptacle reach a predetermined consistency.

Another object is to so construct the power take-off that it will not in any manner interfere with the normal operation of the mechanism of the refrigerator, nor with the efficiency of the cooling of the food compartment thereof, and that it will not have any detrimental effect upon the appearance of either the interior or the exterior of the refrigerator.

The invention possesses other objects and advantageous features, some of which, with those enumerated, will be set forth in the following description of the invention's particular embodiments which are illustrated in the drawings accompanying and forming a part of the specification.

Referring to the drawings:

Fig. 1 is a perspective view of a domestic automatic refrigerator showing an agitator incorporating the principles of the present invention operatively installed therein.

Fig. 2 is a rear elevation of the refrigerator of Fig. 1 and showing one method of connecting the power take-off to the refrigerating mechanism.

Fig. 3 is a view similar to Fig. 2 but showing a slightly modified form of connecting means.

Fig. 4 is another view similar to Fig. 2 but showing still a further method of deriving power for the power take-off device.

Fig. 5 is an enlarged detail view showing one method of attaching the power take-off to one of the shafts of the refrigerating mechanism.

Fig. 6 is a transverse, sectional view taken upon the line 6—6 of Fig. 5 with the direction of view as indicated.

Fig. 7 is an enlarged view partially in longitudinal section and partially in side elevation of the agitator of Fig. 1.

Fig. 8 is a top plan view, partially broken away and shown in section, of the agitator of Fig. 7, the direction of view being indicated by the arrow 8 of that figure.

Fig. 9 is an enlarged detail view showing the method of connecting the power take-off to the agitating device.

Fig. 10 is a vertical, medial, sectional view of a slightly modified form of agitator.

Fig. 11 is a top plan view, the direction of view being indicated by the arrow 11 of Fig. 10.

Fig. 12 is a top plan view of the gland nut whereby a leak-proof seal is established between the cap of the agitator and the shaft of the beater which extends therethrough.

Fig. 13 is a longitudinal, sectional view taken upon the line 13—13 of Fig. 12 with the direction of view as indicated.

In terms of broad inclusion, the present invention contemplates the provision of a power take-off device whereby a portion of the power of the motor which is conventionally employed as the prime mover for the refrigerating mechanism of a domestic automatic refrigerator may be employed for performing such functions as driving a dasher of an ice cream freezer, a beverage mixer, or the like. Incorporated with this power take-off is an improved type of agitating device which, inasmuch as it is adapted to be received within the cooling unit of the refrigerator, is particularly useful for preparing such articles of food as frozen desserts which require either constant or intermittent agitation during the freezing period.

I am aware that domestic refrigerators have been employed previously for the purpose of preparing frozen desserts, such as ice cream and sherbets, but not through the expedient of a power driven agitating device. Instead, the material to be frozen was merely placed in trays inside the cooling unit, a quantity of gelatin being included as one of the ingredients to prevent crystallization thereof upon freezing. Some of the foods thus prepared require that they be removed occasionally and beaten; otherwise, they will be of a granular or crystallin texture in spite of the inclusion of a quantity of gelatin. However, the foods thus prepared have proven to be lacking in quality as compared to similar foods which are subjected to continued agitation throughout all or portions of the freezing period, inasmuch as the foods thus agitated are of a much more creamy nature as compared to the custard-like foods prepared by the use of gelatin. Accordingly, frozen desserts prepared by means of my improved agitating device are of a much finer quality than those previously produced in the cooling units of automatic refrigerators.

Specifically describing the invention in one of its preferred embodiments, Fig. 1 shows an agitating device 16 operatively mounted within the cooling unit 17 of a domestic automatic refrigerator 18 of any suitable design. This refrigerator is illustrated as consisting of a cabinet 15 having a food compartment 19 and a compressor compartment 21 therein, the food compartment 19 being provided with a door 22 and the compressor compartment 21 being made accessible by the removal of a grating 23. Refrigerating fluid is applied to the cooling unit 17 by means of a refrigerating mechanism indicated in its entirety at 24, but inasmuch as the specific design of this refrigerating mechanism constitutes no portion of the present mechanism it will not be described in detail herein other than to explain that it includes an electric motor 26, the shaft of which usually is provided with a ventilating fan 27 and is coupled by means of a drive chain or belt 28 to a fly wheel 29, the shaft 31 of which is connected to a compressor 32 whereby refrigerant is supplied under pressure to the cooling unit 17.

The power take-off device comprises a flexible conduit 36 having a flexible shaft 37 extending revolubly therethrough, the conduit 36 and shaft 37 extending from the compressor compartment 21 to a position within the food compartment 19 adjacent the front end of the cooling unit 17, preferably by passing through the rear wall of the refrigerator. Any suitable means are employed for coupling the shaft 37 to the motor 26 to be rotated thereby; for example: Fig. 5 shows an angular housing 38 affixed to the conduit 36 with the shaft 37 extending thereinto and having a bevel gear 39 mounted thereupon inside the housing 38. Another bevel gear 41 journaled within the housing 38 is enmeshed with the gear 39 and is carried by a stub shaft 42 which extends laterally from the housing 38 and carries a head 43. This head 43 is hollow to permit it to receive an end of a shaft 44, such as the shaft of the motor 26 or the fan shaft 31. Furthermore, the head 43 is provided with a circumferential split 46 extending throughout a portion of the circumference thereof and a pair of opposed lugs 47 having a bolt 48 extending therethrough, the nut 49 of which may be tightened to clasp the head 43 tightly on to the shaft 44 or 31, as the case might be, whereby rotary motion of that shaft will be imparted through the expedient of the gears 41 and 39 to the flexible shaft 37. Thus, it may be seen that the head 43 may be coupled optionally to the shaft 44 of the motor 26, as indicated in dashed lines at 51, or to the shaft 31 of the compressor 32, as indicated in full lines at 52 upon Fig. 3, depending upon the relative speed of rotation at which it is desired to have the flexible shaft 37 turn. Fig. 2, however, shows a slightly modified method of establishing mechanical interconnection between the flexible shaft 27 and the motor 26. Here the head 43 is dispensed with and a pulley 53 mounted in its place upon the stub shaft 42. The angular housing 38 is carried by a bracket 54 which is pivotally mounted by means of a pin 56, and which is adapted to be swung by means of an operating lever 57 so as to bring the pulley 53 into engagement with the belt or chain 28 whereby rotation may be imparted to the pulley 53 and thence to the flexible shaft 37. This coupling device may be disconnected by moving the lever 57 in the reverse direction to move the pulley 53 out of engagement with the belt 28. Still another method of driving the flexible shaft 37 is by means of an auxiliary electric motor 58 to which the flexible shaft 37 may be permanently connected. This last described method is preferred in the case of an automatic refrigerator the electric motor of which is not of sufficient capacity to provide the power necessary for the refrigerating mechanism as well as for the power take-off and agitating device operated thereby. This last method is also preferred for use in conjunction with automatic household refrigerators in which no electric motor is employed, such, for example, as those which derive the energy necessary for refrigeration from a small gas flame.

Regardless of which method of applying torque to the flexible shaft 37 is used, it becomes apparent from the preceding description that rotating effort is delivered inside the food compartment 19 by means of the flexible shaft 37. This effort may be employed to operate any suitable kind of agitating device whereby beverages, batters, and the like may be mixed, or, it may be employed in conjunction with the agitator 16 which is adapted to be received within the cooling unit 17 in the place of some or all of the freezing trays ordinarily employed therein.

This agitating device, which is designed primarily for use in the preparation of such articles as ice cream, comprises a skeleton framework 61 of such dimensions that it is adapted to be received within the interior of the cooling unit 17. A preferably cylindrical receptacle 62 is journaled within the framework 61 through the expedient of a pin 63 rigid with the framework 61 and seating within a suitable socket 64 in the bottom 66 of the receptacle 62. It should be understood, however, that the pin 63 may be carried by the receptacle and seated within a socket suitably positioned within the framework 61, thereby dispensing with the necessity of forming the socket in the receptacle which might, under certain circumstances, be conducive to the development of a leak whereby the contents of the receptacle 62 might escape. The other end of the receptacle 62, which is closed by a removable cap 67, is supported within the framework 61 through the expedient of the shank 68 of a dasher 69, this shank 68 extending through the cap 67 and being journaled within a bracket 71 which is removably secured upon the forward end of the framewark 61 by means of a pair of bolts 72 and wing nuts 73. A portion of the shank 68 which is exposed by extending through the cap 67 is non-circular in cross-sectional configuration and is adapted to be received within a complementarily shaped socket 76 in a head 77 which is rigid with that end of the flexible shaft 37 which is inside the food compartment 19. The head 77 is contained within a skirt or housing 78 which is rigid with the flexible conduit 36, this skirt being open at its end to permit insertion of the non-circular end 74 of the shank 68 into the socket 76 where it is adapted to be releasably retained by means of a ball 79 pressed by means of a spring 81 into a suitably positioned recess 82 in a wall of the socket 76.

Hence, the dasher 69 is adapted to be rotated by means of the power take-off device, permitting agitation of the contents of the receptacle 62 while that receptacle is disposed inside the cooling unit 17. However, means are provided for resisting rotation of the receptacle 62. Preferably, this resisting means is in the form of a coiled spring 86 under tension between opposed portions of the framework 61 and frictionally engaging the cylindrical side of the receptacle; hence, the resisting means will be operative only until the contents of the receptacle 62 have reached a predetermined consistency, it being understood that as the fluid of which ice cream is made freezes it gradually becomes thicker.

The tension of the spring 86 should be such that when the ice cream is frozen to substantially the desired consistency the receptacle 62 will be permitted to turn with the dasher 69, and means are provided for automatically disconnecting the flexible shaft 37 from the shank 68 of the dasher when such rotary motion of the receptacle 62 occurs. A spiral cam 87 is made fast to the cap 67 of the receptacle 62 and extends outwards past the bracket 71 adjacent the exposed portion 74 of the shank 68. A pin 88 is provided upon the skirt 78 which is carried by the associated end of the flexible conduit 36, the parts being so proportioned and arranged that the pin 88 lies in the path of the cam 87. Consequently, when the receptacle 62 starts to turn, the cam 87 will engage the pin 88 and force it longitudinally away from the shank 68, it being understood that the skirt 78 whereupon the pin 88 is positioned is restrained against rotation by being secured to the conduit 36. However, the tension of the coiled spring 86 should be sufficient that the receptacle 62 is withheld against rotation until the contents of the container, within which the dasher 69 is moving, are frozen to a relatively heavy consistency, whereupon the rotary effect upon the contents, which is imparted thereto by the rotating dasher 69, will be transmitted to the container, causing it to turn against the resistance afforded by the coiled spring, whereupon the cam 87 will engage the pin 88 and cause disconnection of the drive shaft 37, as explained hereinabove. Hence, the operator is not required to watch the machine and disconnect the driving means from the dasher at the proper time, the machine being so constructed that it automatically disconnects itself when the contents of the container are properly frozen.

Inasmuch as under most circumstances the container 62 will be disposed within the cooling unit 17 of the refrigerator 18 in the horizontal position, means are provided for preventing leakage of the liquid contents of the container at the juncture of the cap 67 therewith and through the hole 91 in the cap through which the shank 68 extends. The cap 67 is threadedly secured to the open end of the container 62 as indicated at 92 and a suitably resilient gasket 93 is interposed between the end of the container 62 and the under surface of the cap 67 so as to establish a tight seal at this point. Encircling the hole 91 in the cap 67 is an exteriorly threaded boss 94 upon which is threadedly engaged a gland nut 96 which is adapted to compress a resilient washer 97 against the portion of the shank 68 which extends outwards from the boss 94, with the result that the gland nut 96 and washer 97 operate as a packing to prevent leakage between the cap 67 and the shank 68 which extends therethrough and which revolves with respect thereto. This gland nut 96 and gasket 97 are best shown upon Figs. 12 and 13.

Figs. 10 and 11 show a slightly modified form of agitating device. That already described is intended for use in making foods such as ice cream, but the modification of agitating device 101 illustrated upon Figs. 10 and 11 is intended to be used in mixing beverages, beating eggs, and the like, where a more rapid rotation of the dasher 102 is desired. For this purpose the shank 103 of the dasher 102 is provided upon its outer end with a bevel gear 104 which is enmeshed by a larger bevel gear 106 which is journaled upon a lug 107 extending outwards from the bracket 108 whereby the receptacle 109 of the agitating device 101 is releasably retained within its framework 111. Preferably, the framework 111 is similar to the framework 61 of the previously described modification in that it is adapted to be releasably received within the cooling unit 17. Obviously, however, the agitating device 101 may be employed either within or exteriorly of the cooling unit, depending upon whether or not it is desired to chill or freeze the material being prepared during agitation thereof. A non-circular shank 112 extends axially from the gear 106 and is adapted to be received within the socket 76 in the head 77 of the flexible drive shaft 37, it being understood that the non-circular shank 112 preferably has the same configuration as the exposed end 74 of the shank 68 of the previously described agitating device whereby both modifications may be operated by the same power take-off device. However, owing to the fact that the gears 104 and 106 are interposed between the drive shaft and the dasher 102, the dasher 102 will be rotated at a much more rapid rate than the dasher 69 of the previously described modification, permitting its being employed for an entirely different field of service.

Various changes may be made in the details of construction without departing from the spirit or scope of the invention as defined by the appended claims.

I claim:

1. A power take-off for an automatic refrigerator having a food compartment and a compressor compartment with a compressor and driving means therefor disposed within said compressor compartment, said power take-off comprising a flexible conduit extending from said compressor compartment into said food compartment, a flexible shaft extending revolubly therethrough, means for coupling one end of said shaft to said driving means, and disengageable coupling means carried by the other end of said shaft within said food compartment.

2. A power take-off for an automatic refrigerator having a food compartment and a compressor compartment with a compressor and driving means therefor disposed within said compressor compartment having a belt drive between the driving means and the compressor, said power take-off comprising a flexible conduit extending from said compressor compartment to said food compartment, a flexible shaft extending revolubly therethrough, a pulley having the flexible shaft connected thereto, means to engage and disengage the pulley with the belt, and a disengageable coupling means carried in the other end of said shaft within said food compartment.

3. A power take-off for an automatic refrigerator having a food compartment and a compressor compartment with a compressor and driving means therefor disposed within said compressor compartment, said power take-off comprising a flexible conduit extending from said compressor compartment into said food compartment, a flexible shaft extending revolubly therethrough, means for coupling one end of said shaft to the compressor, and disengageable coupling means carried by the other end of said shaft within said food compartment.

4. A power take-off for an automatic refrigerator having a food compartment and a compressor compartment with a compressor and driving means therefor disposed within said compressor compartment, an auxiliary motor in the compressor compartment, said power take-off comprising a flexible conduit extending from said compressor compartment into said food compartment, a flexible shaft extending revolubly therethrough, means for coupling one end of said shaft to the auxiliary motor, and disengageable coupling means carried by the other end of said shaft within said food compartment.

5. A power take-off for an automatic refrigerator having a food compartment and means to refrigerate said compartment, said power take-off comprising a flexible conduit extending into said food compartment, means to restrain said conduit from rotation, a flexible shaft extending through the conduit, a motor outside of the food compartment, a coupling means between the shaft and the motor, and disengageable coupling means carried by the other end of the flexible shaft within said food compartment.

GEORGE J. SMITH.